F. J. GERRARD.
DEVICE FOR KEEPING LIDS COOL.
APPLICATION FILED DEC. 3, 1918.

1,299,321.

Patented Apr. 1, 1919.

Witnesses

Inventor
Frederick J. Gerrard,
By Franklin N. Hough
Attorneys

UNITED STATES PATENT OFFICE.

FREDERICK J. GERRARD, OF MONROE, NEBRASKA, ASSIGNOR OF ONE-HALF TO CARL O. HART, OF MONROE, NEBRASKA.

DEVICE FOR KEEPING LIDS COOL.

1,299,321.

Specification of Letters Patent.

Patented Apr. 1, 1919.

Application filed December 3, 1918. Serial No. 265,121.

*To all whom it may concern:*

Be it known that I, FREDERICK J. GERRARD, a citizen of the United States, residing at Monroe, in the county of Platte and State of Nebraska, have invented certain new and useful Improvements in Devices for Keeping Lids Cool; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in device for keeping the knob upon covers of kettles, pots, etc., cool, and affording means for preventing rusting of the fastening screw by which the knob is held to the lid.

The invention consists of further details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which.

Figure 1:
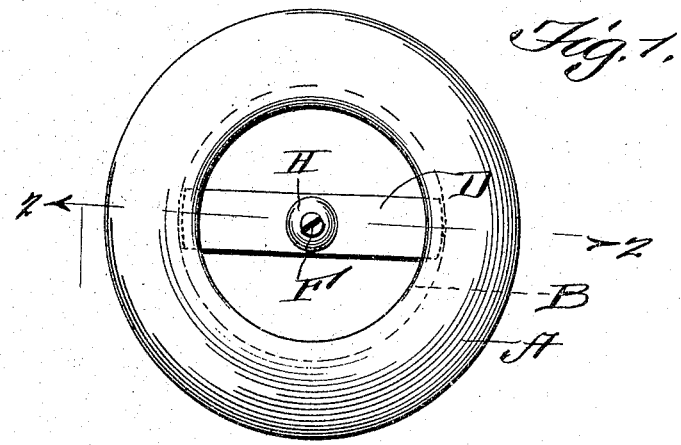
Figure 1 is a top plan view of my invention.
Figure 2:
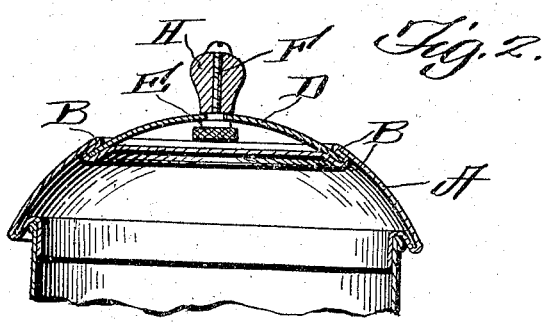
Fig. 2 is a sectional view on line 2—2 of Fig. 1.
Figure 3:
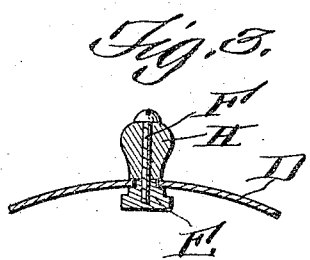
Fig. 3 is a sectional view showing the shape of the knob carrying lid before being pressed into engagement with the flanges of the lid proper.

Reference now being had to the details of the drawings by letter:

A designates a lid for a pot or kettle, having a flanged edge adapted to engage the kettle or pot in the usual manner. Said lid has a portion bent upon itself forming a circular flange B. A bowed strip D, of circular outline, which before being adjusted in place upon the lid assumes the shape shown in Fig. 3 of the drawings, said bowed strip being centrally apertured to receive the contracted end of a nut E. Said nut E has a hole therein the walls of which are threaded to receive the screw F, which also passes through the knob H and affording means for holding the latter securely to the strip. After the knob has been attached to the strip, the latter which is of general conical shape, is placed adjacent to the marginal edge of the flange B and the edge of the strip is pressed underneath the flange to securely hold the same in place.

By the provision of the means forming the subject of my invention, it will be noted that the lid proper will be without any hole through which steam may pass and as a result the screw will be prevented from rusting and at the same time the knob prevented from over-heating, which would be the case if the knob were fastened through to the lid.

What I claim to be new is:

In combination with a convexed lid having a circumferential flange, a portion of the lid intermediate the flange and its upper portion being bent upon itself to form an overhanging flange of circular outline, an apertured bowed strip, the ends of which engage underneath said flange, a longitudinally apertured knob, a nut positioned underneath said strip and having a contracted portion passing through the aperture of the strip, and a screw engaging a threaded aperture in said knob and nut.

In testimony whereof I hereunto affix my signature in presence of two witnesses.

FREDERICK J. GERRARD.

Witnesses:
S. E. PEARSON,
BEDA SWANSON.

Copies of this patent may be obtained for five cents each, by addressing the "Commissioner of Patents, Washington, D. C."